July 24, 1956 C. D. STRANG 2,755,897
ENGINE CLUTCH CONTROL SPEED REDUCING MECHANISM
Filed Dec. 3, 1954 2 Sheets-Sheet 1

INVENTOR
CHARLES D. STRANG
BY Steve W. Gremban
ATTORNEY

July 24, 1956
C. D. STRANG
2,755,897
ENGINE CLUTCH CONTROL SPEED REDUCING MECHANISM
Filed Dec. 3, 1954
2 Sheets-Sheet 2
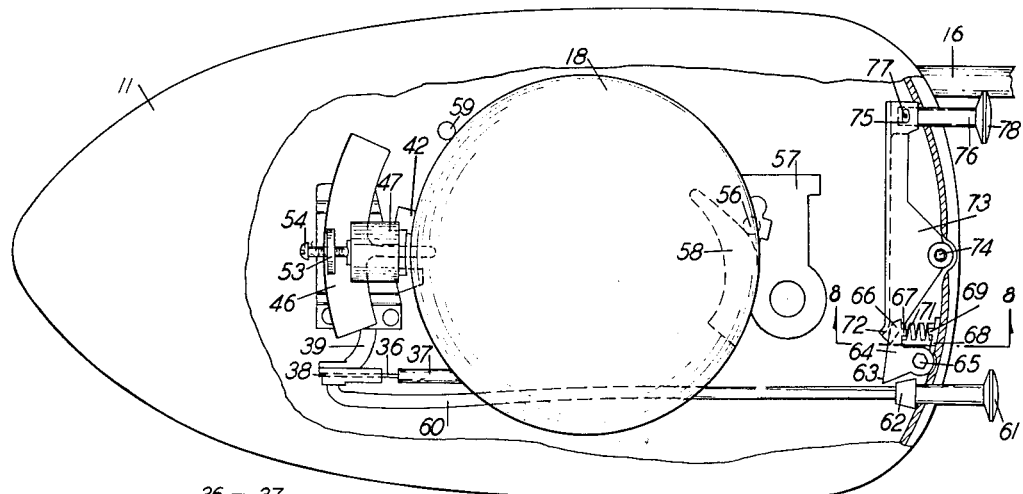
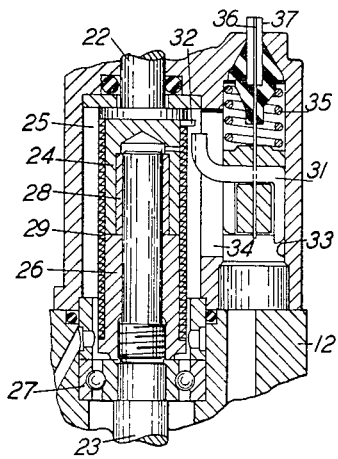
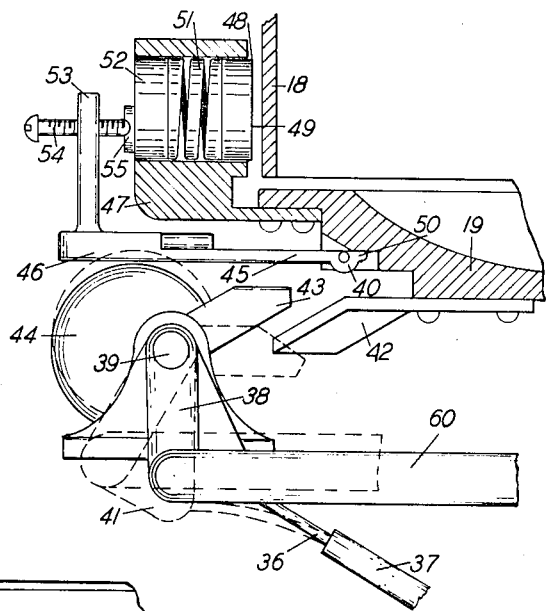
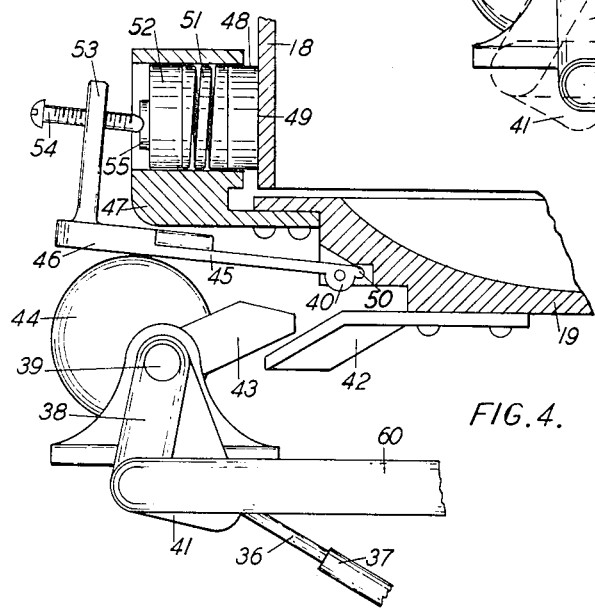
INVENTOR
CHARLES D. STRANG
BY Steve W. Gremban
ATTORNEY

United States Patent Office 2,755,897
Patented July 24, 1956

2,755,897

ENGINE CLUTCH CONTROL SPEED REDUCING MECHANISM

Charles D. Strang, Oshkosh, Wis., assignor to Kiekhaefer Corporation, Cedarburg, Wis.

Application December 3, 1954, Serial No. 473,019

13 Claims. (Cl. 192—.096)

This invention relates generally to an engine clutch control mechanism and more specifically to a clutch control speed reducing mechanism which upon a single uninterrupted movement of the clutch control reduces the engine speed to a safe shifting range following by disengagement of the clutch connecting the engine to the drive shaft.

Heretofore, it has been necessary to manually reduce the engine speed of an internal combustion engine such as an outboard motor to a safe shifting range before actuating the clutch control mechanism to disengage the clutch. Applicant's invention provides an improved clutch control including a push-button actuated link mechanism for selectively engaging and disengaging the clutch coacting with a speed reducing means for reducing the speed of the engine to a safe shifting range upon movement of the push-button link mechanism to disengage the clutch. A safety device comprising an interlocking means is incorporated in the clutch control to positively delay disengagement of the clutch until the engine speed is reduced to a safe shifting range in case of failure of the speed reducing means.

An object of the invention is to provide an improved clutch control mechanism which may be operated by the operator without causing damage to the transmission gears.

Another object is to provide for the more positive engagement and disengagement of the clutch mechanism.

A further object of the invention is the provision of speed reducing means actuated by the clutch control mechanism to reduce the speed of the engine sufficiently to allow shifting without damage to the engine.

Another object of the invention is to provide a clutch control mechanism that is readily accessible to the operator and requires less time or effort to manipulate than prior known clutch control mechanisms.

Another object is to provide a clutch control mechanism that operates with substantial or identical manipulation irrespective of the steering position of the motor.

Objects and advantages other than those set forth above will be apparent from the following description when read in connection with the accompanying drawing, in which:

Fig. 3 is a top plan view partially in section of the motor shown in Fig. 2 showing the clutch control mechanism and speed reducing means;

Fig. 4 is a fragmentary elevation view partially in section showing the speed reducing mechanism in an engaged position with the control lever moving toward the neutral position;

Fig. 5 is a fragmentary elevation view partially in section showing in solid lines the speed reducing mechanism in a disengaged position with the control level in the drive position, and in dotted lines the speed reducing mechanism in a disengaged position with the control lever in neutral position;

Fig. 7 is a view similar to Fig. 6 showing the clutch in the drive position.

Figure 2:
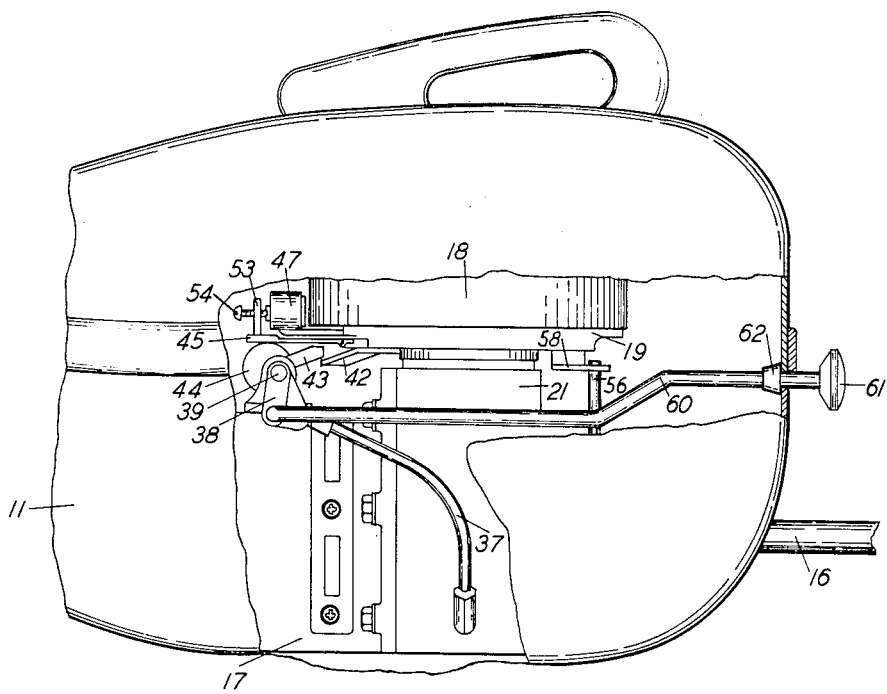
Fig. 2 is a fragmentary elevation view partially in section of the upper end of the motor showing the control lever mechanism in the drive position.

As shown in the drawings, a preferred embodiment of this invention is illustrated as applied to an outboard motor unit 9 which is provided with a clamp bracket assembly 10 for securement of the unit 9 to a transom of a boat, not shown. The upper end of the motor unit 9, including a cowl 11, is supported by a drive shaft housing 12. A lower propeller unit 13 is fixed to the lower end of the drive shaft housing 12 and includes a propeller 14. The upper end of the drive shaft housing 12 is rotatable within a swivel bracket 15 of the clamp bracket assembly 10 on a vertical axis for steering of the boat, not shown, by turning the motor unit 9 as by means of a tiller 16.

An engine 17 of the outboard motor unit 9 is enclosed by the cowl 11 and includes a flywheel 18 mounted on a circular plate 19 therebelow. The plate 19 is mounted on the upper end of a crankcase 21 of the engine for rotational adjustment on the axis of the engine crankshaft, not shown, by means of mechanism well known in the art to effect the speed control of the engine 17.

Figure 6:
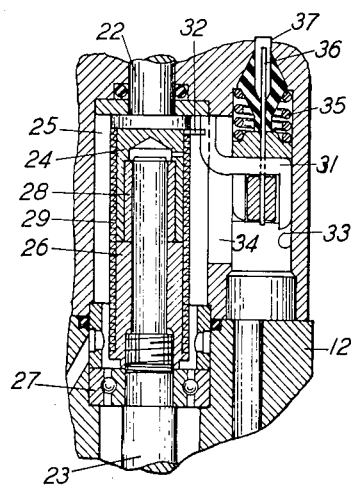
Fig. 6 is a section view taken through the clutch shown in the neutral position.
Figure 1:
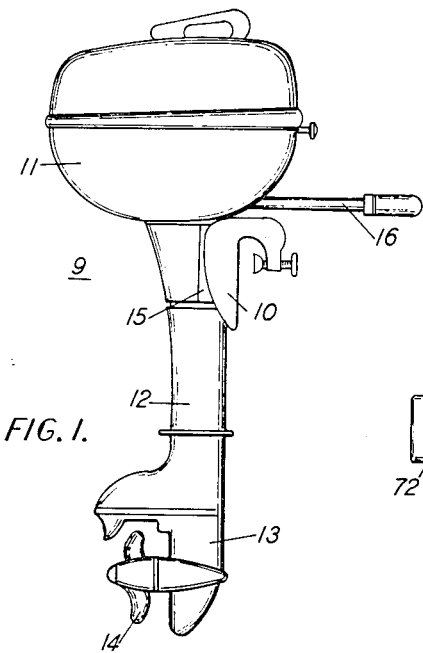
Fig. 1 is a side elevation of an outboard motor in which the invention is embodied.
Figure 8:
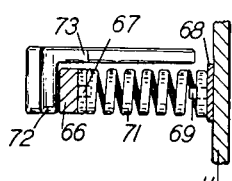
Fig. 8 is a section view taken along line 8—8 of Fig. 3.

Suitable shaft drive means for the transmission of power from the engine 17 to the propeller 14 includes a drive shaft 22 as shown in Figs. 6 and 7 connected to the crankshaft, not shown, to rotate therewith and a shaft 23 selectively connected to the shaft 22 by any suitable clutch means.

The clutch shown in Figs. 6 and 7 includes a cylindrical drive member 24 carried by the lower end of the shaft 22 within a chamber 25 formed in the drive shaft housing 12, and a driven collar 26 mounted on the shaft 23 immediate to and in alignment with the member 24. The shaft 23 is carried by a bearing 27 in the drive shaft housing 12 and projects through the collar 26 into a bushing 28 in the member 24 for supporting the latter and the lower end of the shaft 22.

A coil clutch-spring 29 is mounted on the member 24 and the collar 26 and is wound in a direction so that rotation of the shaft 22 winds the spring 29 to contract the same and effect the driving connection of the member 24 and the collar 26.

The release of the spring 29 is selectively effected by an S-shaped release bar 31 which is movable into interference with a projecting upper end 32 of the spring 29. Upon such interference the rotation of the member 24 tends to expand the spring 29 and effects their relative disengagement whereby the engine 17 may be running without driving the propeller 14.

The release bar 31 is slidably carried in a bore 33 formed in the housing 12 adjacent to the chamber 25, and projects through a slot 34 providing communication between the same. The bar 31 is normally retained in a lower position out of interference with the spring 29 by a spring 35 seated against the upper end of the bore 33. The spring 35 effects clutch engagement of the drive means of the outboard motor unit and yields to the operation of the clutch control to allow clutch disengagement as will be described.

The lower end of a control cable 36 is fixed to the release bar 31 and operates within a casing 37 which extends upwardly through the drive shaft housing 12 and terminates at one side of the engine 17 adjacent a crank 38 having a shaft 39 disposed on the top of the engine 17 adjacent the stator plate 19. The end of the cable 36 is secured to the intermediate portion of the crank 38 by a clamp 41 which provides for the adjustment of the movement of the bar 31 within the range of movement of the crank 38. The rotation of the shaft 39 operates through the crank 38 and the cable 36 to move the bar 31 into interference with the clutch spring 29 to disengage the clutch and stop the propeller 14 with the engine 17 continuing to run.

A sector 42 is mounted on the stator plate 19 so that in any position for a speed less than a given maximum, the sector 42 is clear of an arm 43 secured to the shaft 39 of the crank 38 permitting the operator to move the crank 38 against the spring 35 of the clutch mechanism to effect immediate clutch disengagement as desired. In the position of clutch disengagement, the arm 43 is disposed in the path of the sector 42 preventing adjustment of the stator plate 19 to any speed higher than the maximum referred to.

A speed reducing mechanism for the engine 17 shown in Figs. 4 and 5 includes a cam 44 mounted on the shaft 39 of the crank 38 adapted to engage an arm 45 having a substantially T shaped arcuate cam engaging end 46 as shown in Fig. 3 and the other end of the arm pivotally mounted to the stator plate 19 as at 40. The arcuate length of the arcuate end 46 is predetermined so that at maximum engine speed, a portion of the end 46 is riding on the cam 44 and at a speed below a given maximum for safe shifting, the end 46 is no longer in engagement with the cam 44 releasing the arm 45. The arm 45 is prevented from dropping too far by means of stop 50 adjacent the pivot engaging the stator plate 19 which permits the end 46 of the arm 45 to pass over the cam 44 when the plate 19 is rotatively moved to increase the engine speed. The stator plate 19 has a cylindrical member 47 secured to the stator plate 19 with one end of the member spaced from the flywheel 18. A cylindrical friction disc 48 formed of any suitable friction material is disposed loosely within the member 47 for axial movement therein with the face 49 thereof biased by means of a spring 51 and cylindrical piston 52 into frictional engagement with the side surface of the flywheel 18 upon movement of the arm 45. The arm movement is transmitted to the piston 52 by means of a flange 53 mounted on the arm 45 having a threaded adjusting screw 54 passing through the end thereof with pivotal means 55 at the end of the screw adapted to engage the end surface of the piston 52. The amount of frictional force exerted by the disc 48 is controlled by the adjusting screw 54. The face 49 of the disc 48 is preferably arcuately formed to complement the cylindrical flywheel 18 to present the greatest area of frictional contact therebetween. The side surface of the flywheel 18 may be provided with indentations or a friction surface bonded thereto such as rubber to provide increased frictional engagement between the flywheel 18 and the disc 48. In operation, with the engine speed above the given maximum for safe shifting, movement of the crank 38 and cable 36 causes the cam 44 to engage the end 46 of the arm 45 moving the arm upwardly with the flange 53 and screw 54 forcing the friction disc 48 into frictional contact with the rotating flywheel 18 thereby imparting a rotary movement to the stator plate 19 in the same direction as the flywheel 18. A throttle arm 56 is biased by a spring, not shown, of the carburetor 57 to act as a cam follower and is adapted to ride on a cam 58 mounted on the stator plate 19 as shown in Fig. 3. The cam 58 is shaped so that movement thereof in the same direction as the flywheel 18 results in a reduction of speed of the engine 17. An abutment means shown as a peg 59 mounted on the engine 17 is provided to engage one end of the sector 42 mounted to the stator plate 19 to limit the rotational movement of the stator plate 19. When the engine speed reduces to a value below the given maximum for safe shifting, the arcuate end 46 rides past the cam 44 releasing the arm 45 and the frictional force exerted upon the flywheel 18 by the friction disc 48. The sector is clear of the arm to permit continued movement of the crank 38 and cable 36 to effect clutch disengagement. Thus the speed reducing is accomplished followed by clutch disengagement, both actions effected by one continuous movement of the crank 38 in one direction.

The push-button clutch control mechanism comprises a lever 60 having one end pivotably connected to one end of the crank 38 by any suitable means and the other end provided with a push-button 61 and a projection shown as a boss 62 spaced therefrom having a frusto-conically shaped cross section. The boss 62 coacts with an abutment 63 at one end of a locking member 64 pivotably connected to the cowl 11 by means of a bolt 65. The other end of the locking member 64 is provided with a flange 66 having a lip 67 thereon. A spring retainer 68 has one end connected to the bolt 65 by means of a hook, not shown, or any other suitable means, and the other end provided with a lip 69 in alignment with the lip 67. A spring 71 is interposed between the lip 67 of the flange 66 and the lip 69 of the spring retainer 68 to urge the abutment 63 of the locking member 64 toward the lever 60. The flange 66 further rides on a cam 72 formed by one end of a release member 73 pivotably mounted to the cowl 11 by means of a bolt 74. The other end of the release member 73 forms a U-shaped channel 75 into which one end of a release lever 76 is inserted and pivotably connected thereto by means of a key 77 or any other well known means. The other end of the release lever 76 is provided with a conventional button 78.

In operation, the outboard motor 9 is placed in "neutral" by pressing the button 61 inwardly, moving the lever 60, crank 38, cable 36 and bar 31 so that the bar 31 engages the clutch spring 29 to disengage the clutch. This positioning of the outboard motor in neutral may be accomplished at any speed since movement of the lever 60 and crank 38 causes the cam 44 to actuate the arm 45 forcing the friction disc 48 into frictional engagement with the rotating flywheel 18. The rotation of the flywheel 18 imparts movement to the stator plate 19 in the same direction as the flywheel 18 with the throttle arm 56, which is biased by a spring, not shown, following the contour of the cam 58 to reduce the speed of the engine 17. Having effected a reduction in speed below the safe maximum for shifting, continued inward movement of the lever 60 pushes the boss 62 past the abutment 63 of the locking member 64, and upon release of the button, a shoulder of the boss 62 is urged by the spring 35 into mating contact with the abutment 63 thereby resisting movement of the spring 35 and maintaining the clutch disengagement or "neutral" position. When it is desired to effect clutch engagement, the button 78 is pressed causing the release member 73 to pivot about the bolt 74 with the cam 72 forcing the flange 66 of the locking member 64 and spring 71 inwardly. The movement of the flange 66 compels the locking member 64 to pivot about the bolt 65 causing the abutment 63 to be retracted from the shoulder of the boss 62 allowing the spring 35 to expand and move the bar 31 downwardly to effect clutch engagement, and at the same time causing the cable 36, crank 38 and lever 60 to assume their original position. Movement of the lever 60 and crank 38 to their original position has no effect on the speed reducing mechanism since the arcuate T shaped end 46 of the arm 45 is no longer in contact with the cam 44 having cleared the cam by movement of the stator plate 19 and arm 45 in the direction reducing the engine speed. Upon increasing the speed of the engine 17, the end 46 of the arm is once again disposed above the cam 44 for actuation thereby upon movement of the push-button 61 inwardly to effect clutch disengagement.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. In an engine having transmission and clutch means including a shiftable clutch control element for selective operation of the engine in neutral and drive positions, the combination of: a first lever having one end connected to said clutch element, and a first handle means provided on said other end adapted for inward movement thereof for disengaging said clutch to place the engine in a neutral position; a boss mounted on said lever; a pivotable first member including a spring biasing said first member into engagement with said boss upon inward movement of said lever for holding said lever to retain said engine in the neutral position; a second member pivotably mounted on said engine having one end adapted to engage said first member; a second lever having one end connected to the other end of said second member and the other end of said second lever being provided with a second handle means for manual inward manipulation whereby said one end of said second member is actuated to pivotably urge said first member against the action of said spring to withdraw said first member from engagement with said boss thereby releasing said first lever to effect engagement of said clutch to place said engine in a drive position.

2. In an engine having a rotatable flywheel and transmission clutch means including a shiftable clutch control element for selective operation of the engine in neutral and drive positions, the combination of: means coacting with said clutch control element for disengaging said clutch to place the engine in the neutral position, speed reducing means actuated into engagement with said rotating flywheel by said first named means to reduce the speed of the engine below a predetermined maximum safe shifting speed before said first named means disengages said clutch, means engaging said first named means for holding said first named means whereby said engine is retained in the neutral position, and manual release means coacting with said second named means for releasing said second named means to effect engagement of said clutch to place said engine in the drive position.

3. In an outboard motor having a rotatable flywheel, a speed control element and transmission clutch means including a shiftable clutch control element for selective operation of the motor in neutral and drive positions, the combination of: crank means connected to said clutch control element including a shaft mounted on said motor; and cam means mounted on said shaft adapted to actuate said speed control element, said speed control element engaging said rotating flywheel to move said speed control element in the direction of rotation of said flywheel to reduce the speed of the engine below a predetermined maximum safe shifting speed before said crank means disengages said clutch.

4. In an engine having a rotatable flywheel and transmission clutch means including a shiftable clutch control element for selective operation of the engine in neutral and drive positions, speed reducing means actuated into engagement with said rotating flywheel by said clutch control element to reduce the speed of the engine below a predetermined maximum safe shifting speed before said clutch control element shifts the engine into neutral or drive positions.

5. The invention as defined in claim 4 wherein the clutch control element is provided with cam means adapted to actuate said speed reducing means to engage said rotating flywheel.

6. The invention as defined in claim 4 wherein the clutch control element comprises a lever having cam means mounted on one end thereof, and the speed reducing means comprises a friction member and an arm operatively engageable by said cam means to force said friction member into frictional engagement with said rotating flywheel.

7. In an engine having clutch means including a shiftable clutch control element for selective operation of the engine in neutral and drive positions, the combination of: resilient means for biasing said clutch control element to place the engine in one of said positions, a lever having one end connected to said clutch control element and the other end adapted for inward movement for urging said clutch control element against the bias of said spring to place the engine in the other of said positions, a projection formed on said lever, a first member adapted to engage said projection upon inward movement of said lever for holding said lever to retain said engine in the other of said positions, and a second member pivotable intermediate its ends and having one end movable in a first direction causing said other end to move in the opposite direction to engage and urge said first member in said opposite direction to withdraw said first member from engagement with said projection whereby said resilient means urges said clutch control element to place said engine in said one of said positions.

8. The combination of claim 2 wherein the clutch control element is provided with cam means adapted to actuate said speed reducing means into engagement with said rotating flywheel.

9. The invention as defined in claim 8 wherein the clutch control element comprises a lever having cam means mounted on one end thereof, and the speed reducing means comprises a friction member actuated by said cam means to force said friction member into frictional engagement with said rotating flywheel.

10. The combination of claim 9 wherein the speed reducing means comprises a friction member and an arm pivotably mounted on said engine and operatively engageable by said cam means to force said friction member into frictional engagement with said rotating flywheel.

11. The invention as defined in claim 4 wherein the clutch control element comprises a lever having cam means mounted on one end thereof, and the speed reducing means comprises a friction member actuated by said cam means to force said friction member into frictional engagement with said rotating flywheel.

12. In an engine having clutch means including a shiftable clutch control element for selective operation of the engine in neutral and drive positions, the combination of: a spring for biasing said clutch control element to place the engine in one of said positions, a lever having one end connected to said clutch control element and the other end adapted for inward movement for urging said clutch control element against the bias of said spring to place the engine in the other of said positions, a projection formed on said lever, a first member adapted to engage said projection upon inward movement of said lever for holding said lever against the bias of said spring to retain said engine in the other of said positions, and a second member pivotable intermediate its ends and having one end movable in a first direction causing said other end to move in the opposite direction to engage and urge said first member in said opposite direction to withdraw said first member from engagement with said projection whereby said spring urges said clutch control element to place said engine in said one of said positions.

13. In an engine having clutch means including a shiftable clutch control element for selective operation of the engine in neutral and drive positions, the combination of: resilient means comprising a spring axially movable vertically in one direction for biasing said clutch control element in said one direction to place the engine in one of said positions, a lever having one end connected to said clutch control element and the other end adapted for inward movement for axially urging said clutch control element in the opposite direction against the bias of said spring to place the engine in the other of said positions, a boss mounted on said lever, a first member adapted to engage said boss upon inward movement of said lever for holding said lever to retain said engine in the other of said positions, and a second member pivotable intermediate its ends and having one end movable in a first direction causing said other end to move in the opposite direction to engage and urge said first member in said opposite direction to withdraw said first member from engagement with said boss whereby said spring axially urges said clutch control element in said one direction to place said engine in said one of said positions.

References Cited in the file of this patent

UNITED STATES PATENTS

| | | |
|---|---|---|
| 1,814,896 | Chartier | July 14, 1931 |
| 2,044,395 | McGrath | June 16, 1936 |
| 2,051,975 | Wemp | Aug. 25, 1936 |
| 2,229,055 | Dick | Jan. 21, 1941 |